(12) United States Patent
Chen et al.

(10) Patent No.: US 8,523,442 B2
(45) Date of Patent: Sep. 3, 2013

(54) SUPPORTING BEARING

(75) Inventors: Shang-Te Chen, Hsinshu (TW); Chien-Chin Liao, Hsinchu (TW); En-Sheng Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 244 days.

(21) Appl. No.: 13/100,707

(22) Filed: May 4, 2011

(65) Prior Publication Data

US 2012/0141054 A1  Jun. 7, 2012

(30) Foreign Application Priority Data

Dec. 3, 2010 (TW) ................................ 99142077 A

(51) Int. Cl.
*F16C 29/06* (2006.01)
(52) U.S. Cl.
USPC ................................................................ 384/44
(58) Field of Classification Search
USPC ....................... 384/8, 9, 43–45, 451, 618, 623
See application file for complete search history.

(56) References Cited

U.S. PATENT DOCUMENTS

| | | | | |
|---|---|---|---|---|
| 4,273,389 A * | 6/1981 | Takai | ............................... | 384/45 |
| 4,461,518 A * | 7/1984 | Tanaka | ............................. | 384/44 |
| 4,576,422 A * | 3/1986 | Laszlo et al. | ..................... | 384/44 |
| 4,620,751 A * | 11/1986 | Teramachi | ...................... | 384/44 |
| 5,018,878 A * | 5/1991 | Tsukada et al. | ................. | 384/44 |
| 5,382,099 A | 1/1995 | Bauer et al. | | |
| 5,575,565 A * | 11/1996 | Takei et al. | ..................... | 384/45 |
| 7,785,011 B2 * | 8/2010 | Reist | ............................... | 384/44 |
| 2007/0009191 A1 | 1/2007 | Gresley | | |
| 2007/0116392 A1* | 5/2007 | Ishikawa et al. | ............. | 384/445 |

FOREIGN PATENT DOCUMENTS

| | | |
|---|---|---|
| DE | 4227366 A1 | 2/1994 |
| DE | 4334611 A1 | 4/1994 |
| DE | 102005053622 A1 | 5/2007 |
| DE | 102008017457 A1 | 10/2009 |
| JP | 5-106638 A | 4/1993 |
| JP | 8-257854 A | 10/1996 |
| JP | 2000271829 A | 10/2000 |
| JP | 2001038552 A | 2/2001 |
| JP | 2002-39175 A | 2/2002 |
| JP | 2002354778 A | 12/2002 |
| TW | 451035 | 8/2001 |
| TW | 200833964 A | 8/2008 |

* cited by examiner

*Primary Examiner* — Thomas R Hannon
(74) *Attorney, Agent, or Firm* — Muncy, Geissler, Olds & Lowe, PLLC

(57) ABSTRACT

Disclosed is a supporting bearing for providing a large rotary module with an axial supporting force. The supporting bearing includes a body, a sliding track and a plurality of rolling members, wherein the sliding track is embedded in the body, and the rolling members are disposed so as to roll in the sliding track and to protrude from the top of the body, thereby providing higher precision and better rigidity to the large rotary module.

11 Claims, 5 Drawing Sheets

SUPPORTING BEARING

TECHNICAL FIELD

This disclosure relates to supporting bearings, and more particularly, to a supporting bearing for providing a large rotary module with an axial supporting force.

BACKGROUND

In a design of a large rotary module of a machine tool, the most important issue is whether or not a bearing assembly is able to provide a desired supporting force, so as to provide the rotary module with sufficient precision and rigidity. Nowadays, the so-called "three-piece bearing configuration" is normally used as the bearing assembly of a large rotary module.

Germany Patent No. DE4227366A1 and Germany Patent Application No. DE102005053622A1 disclosed a configuration of a three-piece roller bearing, such as an YRT turntable bearing, with a radial bearing and an axial bearing integrally disposed in a single set, wherein the three-piece roller bearing disclosed in Germany Patents No. DE4227366A1 basically only differs from that of No. DE102005053622A1 in the way of configuring the bearings, while both of them are able to serve as a bearing assembly for a large rotary module.

However, the manufacturing cost of the three-piece bearing configuration is very expensive, so that the machine tool manufacturers are still unable to reduce the manufacturing cost. Meanwhile, when users operate a large rotary module with the three-piece bearing configuration, they normally cannot accurately control the precision and rigidity of the large rotary module, in that the configuration of the radial bearing and the axial bearing of the large rotary module are designed to be integrally disposed in a single set.

In summary, it is an urgent problem in the art to be solved how to make a large rotary module having both higher precision and rigidity under a reasonably manufacturing cost.

SUMMARY

The disclosure provides a supporting bearing for providing a large rotary module with an axial supporting force, comprising a body; at least a sliding track embedded in the body; and a plurality of rolling members disposed to movably roll in the sliding track and to protrude from a top surface of the body.

In an embodiment of the disclosure, the supporting bearing further comprises at least a rolling track, which is embedded in the body, and the rolling members are disposed to movably roll in the rolling track and to protrude from a bottom surface of the body.

In summary, the supporting bearing of this disclosure alone, under the corporation of the body, the rolling track, the sliding track, and the rolling members, is capable of providing an axial supporting force for the large rotary module. Further, since the supporting bearing enables the radial bearing and the axial bearing of the large rotary module to be separated from each other, it not only can significantly reduce the manufacturing cost for machine tool manufacturers, but also can accurately control the precision and rigidity of the large rotary module.

Certain embodiments of the disclosure have other aspects in addition to or in place of those mentioned above. The aspects will become apparent to those skilled in the art from a reading of the following detailed description when taken with reference to the accompanying drawings.

DETAILED DESCRIPTION

The following embodiments are described in sufficient detail to enable those ordinarily skilled in the art to make and use the disclosure. It will be apparent that the disclosure may be practiced without these or other specific details known in the art. In order to avoid obscuring the disclosure, some well-known details in configurations are still not disclosed here. It is to be understood that other embodiments would be evident based on the disclosure, and that mechanical changes may be made without departing from the scope of the disclosure.

Figure 1:
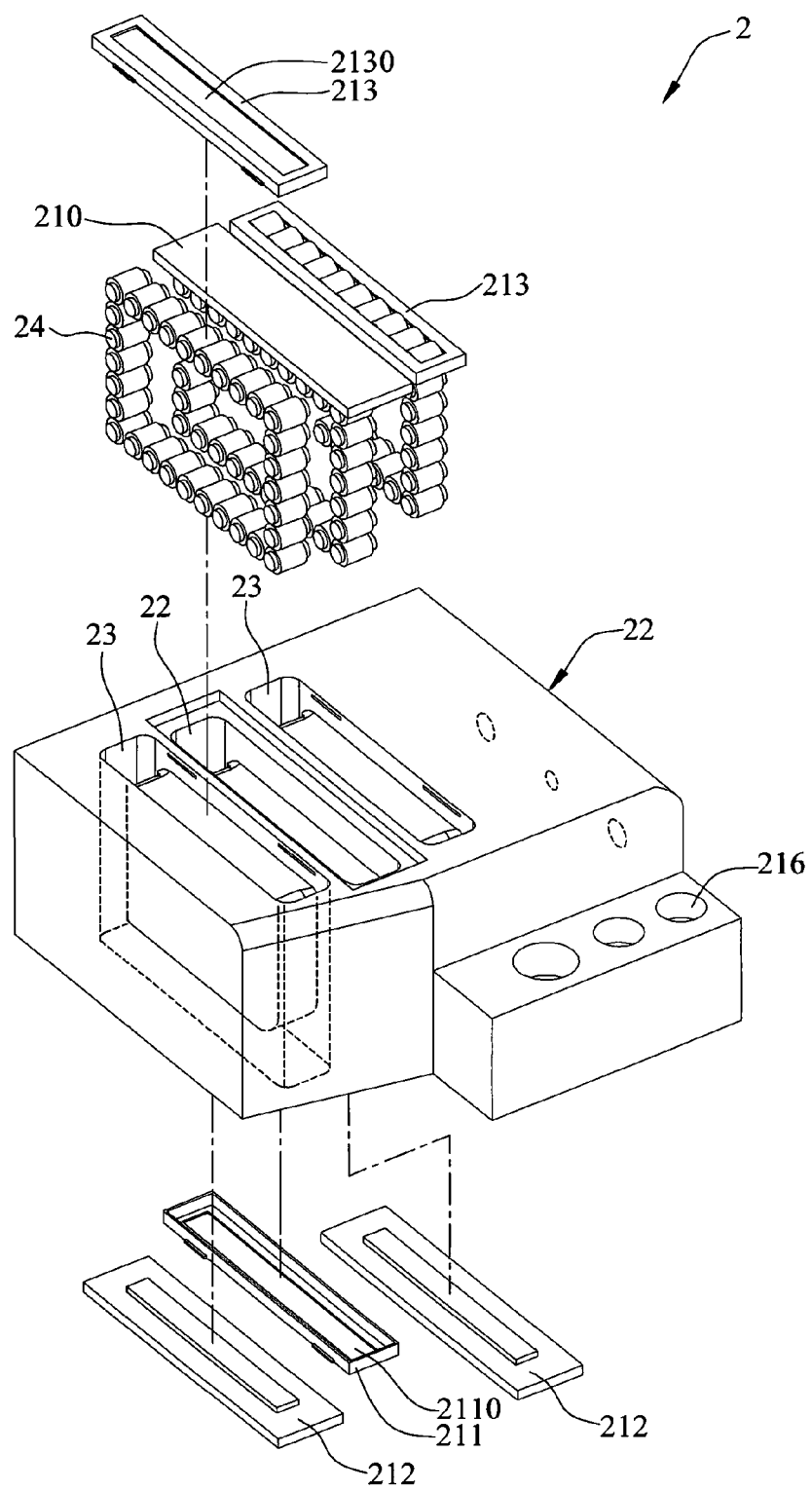
FIG. 1 is an exploded structural diagram of the supporting bearing according to this disclosure.
Figure 2:
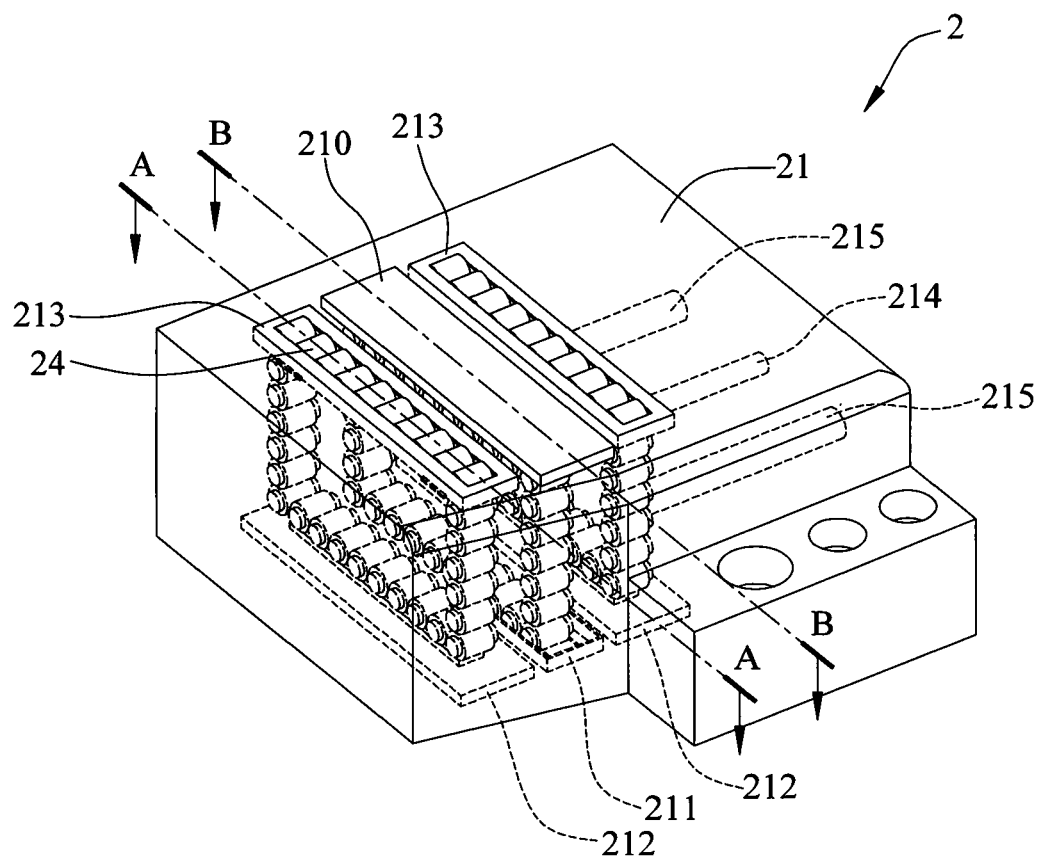
FIG. 2 is an assembled structural diagram of the supporting bearing according to this disclosure.
Figure 3:
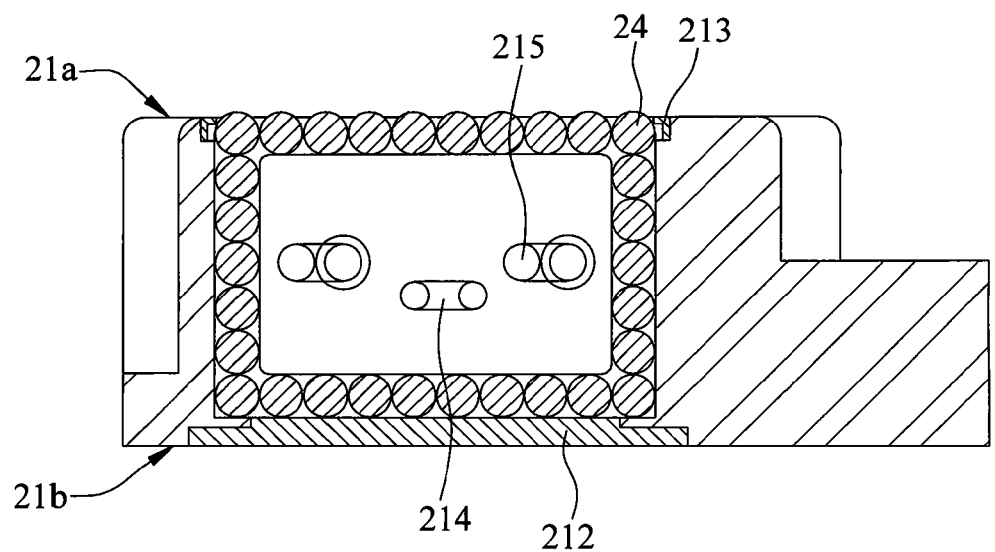
FIG. 3 is a cross-sectional diagram of the supporting bearing according to this disclosure.
Figure 4:
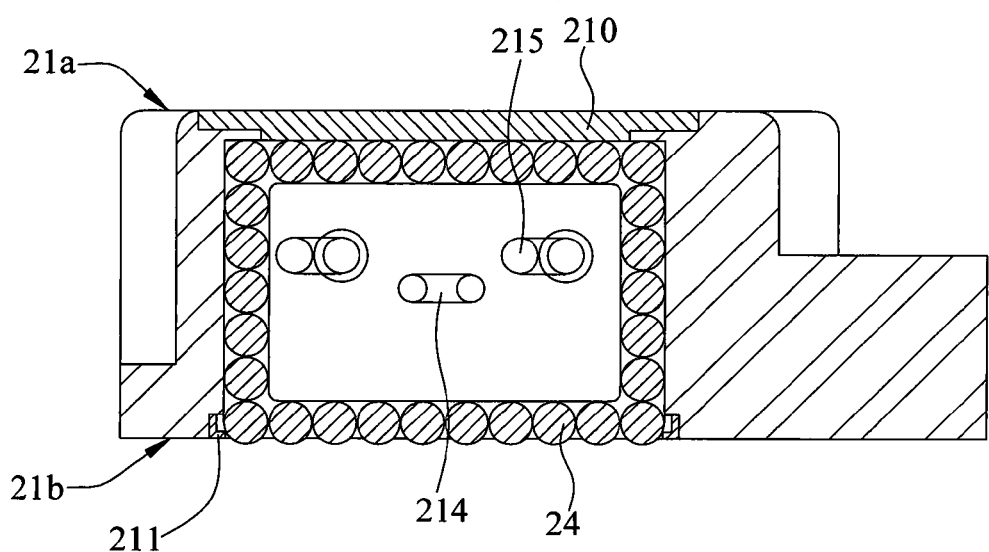
FIG. 4 is another cross-sectional diagram of the supporting bearing according to this disclosure.
Figure 5:
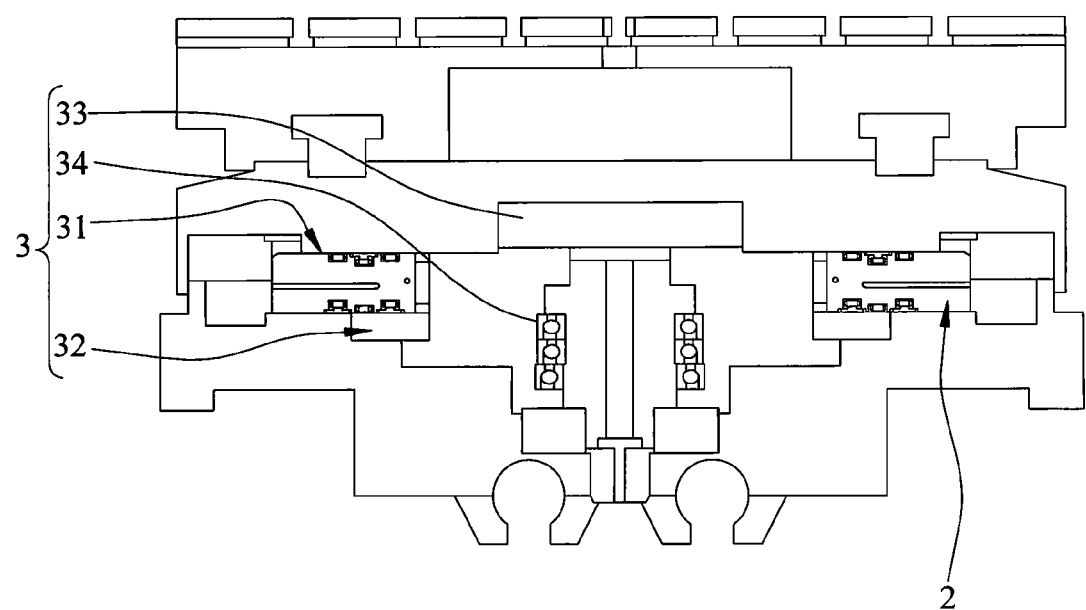
FIG. 5 is a cross-sectional diagram of the supporting bearing disposed in a large rotary module according to this disclosure.
Figure 6:
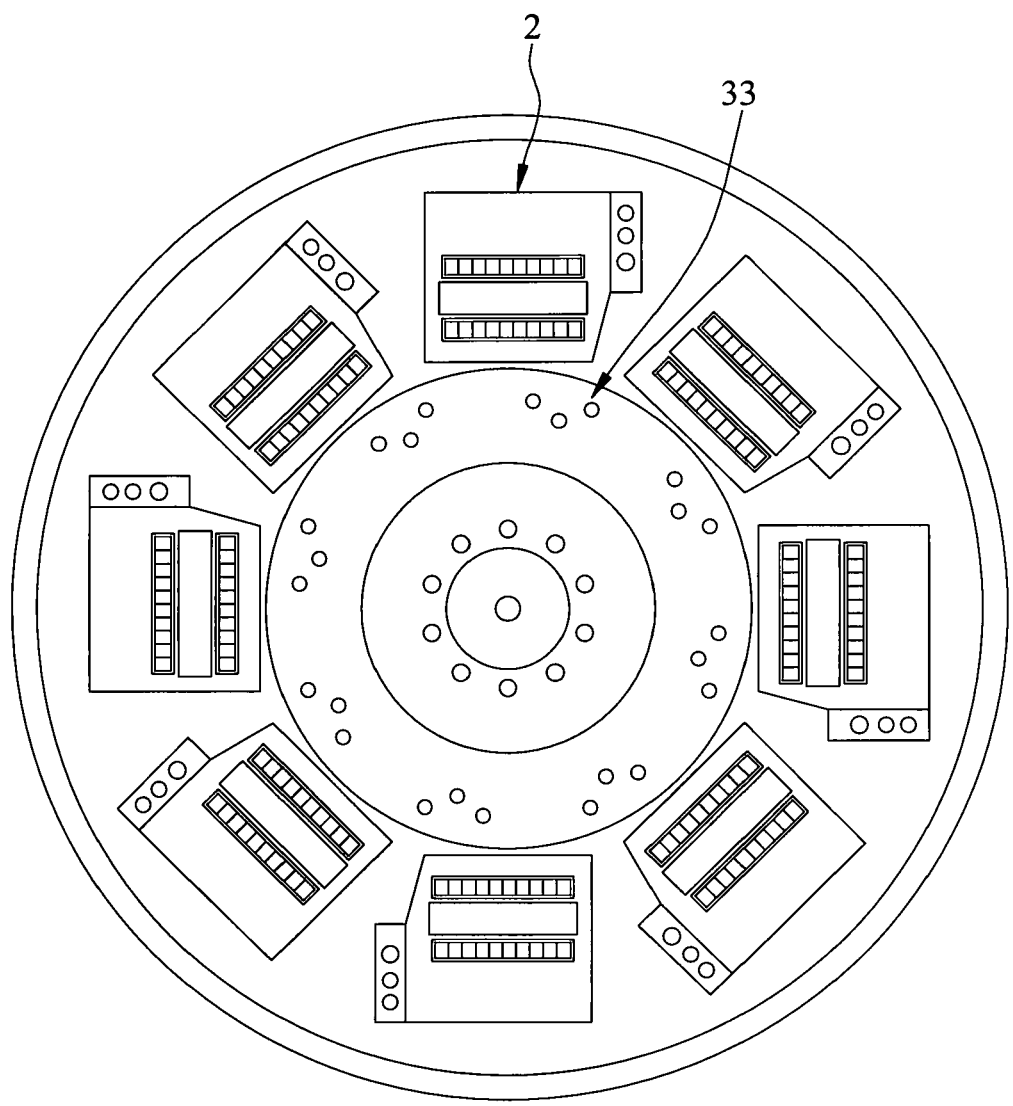
FIG. 6 is a vertical view of a structural diagram of the supporting bearing disposed in a large rotary module according to this disclosure.

Referring to FIGS. 1, 2, 3, 4, 5 and 6 collectively, FIG. 1 is an exploded structural diagram of the supporting bearing in this disclosure; FIG. 2 is an assembled structural diagram of the supporting bearing in this disclosure; FIG. 3 is a cross-sectional diagram of the supporting bearing along the line AA in FIG. 2; FIG. 4 is a cross-sectional diagram of the supporting bearing along the line BB in FIG. 2; FIG. 5 is a cross-sectional diagram of the supporting bearing disposed in a large rotary module in this disclosure; and FIG. 6 is a vertical view of a structural diagram of the supporting bearing disposed on a preloaded-bearing surface of a large rotary module in this disclosure.

As shown, a supporting bearing 2 is to provide an axial supporting force for a large rotary module 3. In the present embodiment, the supporting bearing 2 includes a body 21; a rolling track 22, two sliding tracks 23, and a plurality of rolling members 24. The large rotary module 3 has a rolling bearing surface 31, a preloaded-bearing surface 32, a turntable 33, and a radial supporting bearing 34 exemplified as an angular contact rolling ball. Accordingly, the radial bearing and the axial bearing of the large rotary module 3 can be designed in a separate manner.

Depending on the demands, the body 21 is applicable to include one rolling track 22 and one or more sliding tracks 23. In an embodiment, a rolling track 22 and two sliding tracks 23 penetrate both end of the body 21, and thus are disposed on a top surface 21a and the bottom surface 21b of the body 21 to form a loop-like track structure.

A plurality of rolling members 24 such as rolling balls and/or rollers are disposed in the rolling track 22 and the sliding tracks 23. Specifically, as shown in FIGS. 4 and 5, the rolling members 24 are embedded in the rolling track 22 to roll therein and protrude from the bottom surface 21b of the body 21 to abut against the preloaded-bearing surface 32 of the large rotary module 3. Referring to FIGS. 3 and 5, the rolling members 24 are embedded in the sliding tracks 23 to roll therein and protrude from the top surface 21a of the body 21, so as to abut against the rolling bearing surface 31 of the large rotary module 3.

Further, in order to dispose the plurality of rolling members 24 firmly in the rolling track 22 and the sliding tracks 23, the body 21 can further comprises a rolling track cover plate 210, a rolling-track retainer 211 with a slot 2110, sliding track cover plates 212, and sliding-track retainers 213 with slots 2130.

In detail, the rolling track cover plate 210 is assemblable on the top surface 21a of the body 21, and thus correspondingly covers the rolling track, so as to dispose the plurality of rolling members 24 firmly in the rolling track 22. The rolling-track retainer 211 is assemblable on the bottom surface 21b of the body 21, and correspondingly covers the rolling track 22, so as to dispose the rolling members 24 firmly in the rolling track 22 and to protrude the rolling members 24 from the bottom surface 21b of the body 21 through the slot 2110.

The sliding track cover plates 212 are disposed on the bottom surface 21b of the body 21 and correspondingly covers the sliding tracks 23, so as to dispose the plurality of rolling members 24 firmly in the sliding tracks 23. The sliding-track retainer 213 are assemblable on the top surface 21a of the body 21 and covers the sliding tracks 23, so as to dispose the rolling members 24 firmly in the sliding tracks 23 and to protrude the rolling members 24 from the top surface 21a of the body 21 through the slots 2130.

Therefore, when the large rotary module 3 is in rotation, the rolling members 24 in the rolling track 22 and the sliding tracks 23 circularly move in opposite directions. In order to improve the smoothness of the rotation, the slot 2110 of the rolling-track retainer 211 and/or the slots 2130 of the sliding-track retainers 213 can be formed as a curve corresponding to the rotating diameter of the large rotary module 3.

It is worth mentioning that, when the rolling members 24 are designed as rollers, a stronger supporting force can be provided for the large rotary module 3; however, if a large rotary module 3 with a higher rotary speed is desirable, rolling balls can be used as the rolling members 24. Of course it is able to use, depending on the users' demands, both the rolling balls and the rollers as the rolling members 24.

In addition, the body 21 can further comprise a temperature measurement interface 214 and a cooling circulation pipeline 215. Specifically, the rolling members 24 generate heat while they are rolling and raise the temperature of the body 21, so the cooling circulation pipeline 215 can provide the cooling effect and maintain the temperature of the body 21 in an appropriate range, and then, a life time of the bearing is able to be extended. Certainly, if the temperature measured by the temperature measurement interface 214 is too high, the users can increase the operational efficiency of the cooling circulation pipeline 215 to reduce the temperature of the body 21, and decrease related thermal straining therefrom, such that the machining precision can be further increased.

Moreover, the body 21 can further comprise a locking interface 216 to facilitate users to lock the supporting bearing 2 on the preloaded-bearing surface 32 of the large rotary module 3, certainly, depending on different requirements for loading, the number and the disposing position of the supporting bearing 2 on the preloaded-bearing surface 32 are able to be adjusted. Specifically, the supporting bearing 2 in this disclosure is able to provide a basic dynamic load rating ranging from 600 KG to 2,000 KG, depending on different sizes of the supporting bearing.

It is noteworthy that, the number of the rolling track 22 and the sliding track 23 in this disclosure can be modified depending on different loading circumstances. For example, it is able to provide only one sliding track 23 in the body 21 under a condition of lower loading and no preloading required, and it is able to provide more rolling tracks 22 and sliding tracks 23 in the body 21 correspondingly under a condition that higher loading is applied and thus a preloading and larger supporting force are required.

In an operational test, a supporting bearing 2 provided in a large lathe was tested with 400 KG preloading, and 600 KG to 1,200 KG loadings at 5 rpm operating speed. Under a controlled precision within 0.02 mm per operating circle, the life time of the supporting bearing 2 was up to 10,000 hours long. Further, it is able to provide extremely high precision in the table deflection by way of adjusting the scraping precision. For example, the axial precision of the supporting bearing 2, on a 1,250 mm-length rolling bearing surface, can achieve as high as 0.0015 mm.

Given the above, the supporting bearing in this disclosure can alone provide the axial supporting force for a large rotary module, under the collocation of the body, the rolling track, the sliding track, and the rolling members, such that it is feasible to separate the radial bearing and the axial bearing in the large rotary module, and to accurately control the precision and the rigidity of the large rotary module. Comparing with the prior art, because the supporting bearing of this disclosure alone is provided as an axial bearing for the large rotary module in module, it can replace the high-cost, rigidity and precision uneasily controlled YRT turntable bearing, and thus can reduce the manufacturing cost for machine tool manufacturers.

While the disclosure has been described in conjunction with exemplary preferred embodiments, it is to be understood that many alternatives, modifications, and variations will be apparent to those skilled in the art in light of the foregoing description. Accordingly, it is intended to embrace all such alternatives, modifications, and variations that fall within the scope of the included claims. The scope of the claims, therefore, should be accorded the broadest interpretation so as to encompass all such modifications and similar arrangements. All matters hitherto fore set forth herein or shown in the accompanying drawings are to be interpreted in an illustrative and non-limiting sense.

What is claimed is:

1. A supporting bearing for providing a large rotary module with an axial supporting force, the supporting bearing comprising:
   a body;
   at least a sliding track embedded in the body;
   a plurality of rolling members rollably disposed to roll in the sliding track and protruding from a top surface of the body; and
   at least a rolling track embedded in the body for the rolling members to roll in the rolling track and to protrude from a bottom surface of the body.

2. The supporting bearing of claim 1, wherein the rolling members are rollers.

3. The supporting bearing of claim 1, wherein the rolling track and the sliding track are disposed to surround themselves within the body and partially expose themselves from the top surface and the bottom surface of the body, and when the large rotary module is in rotation, the plurality of rolling members circularly move in the sliding track and the rolling track.

4. The supporting bearing of claim 3, wherein the rolling members in the sliding track and the rolling track circularly move in opposite directions.

5. The supporting bearing of claim 3, wherein the body comprises a rolling-track cover plate, which is assemblable on the top surface of the body and thereby correspondingly covering on the rolling track, so as to dispose the rolling members firmly in the rolling track.

6. The supporting bearing of claim 3, wherein the body comprises a rolling-track retainer having a slot, and the rolling-track retainer is assemblable on the bottom surface of the body to thereby correspondingly cover the rolling track, so as to secure the rolling members firmly in the rolling track and to protrude the rolling members from the bottom surface of the body through the slot.

7. The supporting bearing of claim 6, wherein the slot of the rolling-track retainer is formed for accommodating a rotating diameter of the large rotary module.

8. The supporting bearing of claim 3, wherein the body comprises a sliding-track cover plate, which is assemblable on the bottom surface of the body and thereby correspondingly covering on the sliding track, so as to dispose the rolling members firmly in the sliding track.

9. The supporting bearing of claim 3, wherein the body comprises a sliding-track retainer having a slot, which the sliding-track retainer is assemblable on the top surface of the body to thereby correspondingly cover the sliding track, so as to secure the rolling members firmly in the sliding track and to protrude the rolling members from the top surface of the body through the slot.

10. The supporting bearing of claim 9, wherein the slot of the sliding-track retainer is formed for accommodating a rotating diameter of the large rotary module.

11. The supporting bearing of claim 1, wherein the body comprises a cooling circulation pipeline or a temperature measurement interface.

* * * * *